US007228562B2

(12) United States Patent
Kobayashi et al.

(10) Patent No.: US 7,228,562 B2
(45) Date of Patent: Jun. 5, 2007

(54) STREAM SERVER APPARATUS, PROGRAM, AND NAS DEVICE

(75) Inventors: Ikubo Kobayashi, Kawasaki (JP); Tadashi Takeuchi, Yokohama (JP); Damien Lemoal, Sagamihara (JP); Ken Nomura, Yokohama (JP); Hiroshi Mine, Yokohama (JP); Kenji Hirose, Hitachi (JP); Kouichirou Mizunashi, Iwaki (JP); Mamoru Adachi, Tokai (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 10/743,729

(22) Filed: Dec. 24, 2003

(65) Prior Publication Data

US 2004/0172560 A1 Sep. 2, 2004

(30) Foreign Application Priority Data

Feb. 28, 2003 (JP) ............................. 2003-052231

(51) Int. Cl.
*G06F 17/00* (2006.01)
*G06F 15/16* (2006.01)
*G06F 9/00* (2006.01)

(52) U.S. Cl. ........................................ 726/12; 709/231
(58) Field of Classification Search ................ 713/201; 709/219, 233, 239; 726/12
See application file for complete search history.

(56) References Cited

U.S. PATENT DOCUMENTS

| 5,859,976 | A | * | 1/1999 | Hoag ............................. 725/95 |
| 5,923,885 | A | * | 7/1999 | Johnson et al. ............... 717/176 |
| 5,996,025 | A | * | 11/1999 | Day et al. ..................... 719/328 |
| 5,999,979 | A | * | 12/1999 | Vellanki et al. ............... 709/232 |
| 6,029,164 | A | * | 2/2000 | Birrell et al. .................... 707/3 |
| 6,078,953 | A | * | 6/2000 | Vaid et al. ..................... 709/223 |
| 6,195,680 | B1 | * | 2/2001 | Goldszmidt et al. ......... 709/203 |
| 6,484,261 | B1 | * | 11/2002 | Wiegel .......................... 726/11 |
| 6,621,834 | B1 | * | 9/2003 | Scherpbier et al. .......... 370/532 |
| 6,668,288 | B1 | * | 12/2003 | Midwinter et al. ........... 710/29 |
| 6,671,263 | B1 | * | 12/2003 | Potter et al. ................. 370/261 |

(Continued)

OTHER PUBLICATIONS

Kim, J et al. "TCP-Friendly Internet Video Streaming Employing Variable Frame-Rate Encoding and Interpolation", 2000, IEEE Transactions on Circuits and Systems for Video Technology, vol. 10 No. 7, pp. 1164-1177.*

(Continued)

*Primary Examiner*—Ayaz Sheikh
*Assistant Examiner*—Matthew Henning
(74) *Attorney, Agent, or Firm*—Mattingly, Stanger, Malur & Brundidge, P.C.

(57) ABSTRACT

A stream server that includes a first interface for transmitting and receiving packets to and from a client apparatus belonging to a particular network without involvement of a firewall apparatus and for transmitting and receiving packets to and from the client apparatus belonging to a network different from the particular network via the firewall apparatus, a second interface for transmitting and receiving packets to and from the client apparatus belonging to the network different from the particular network without involvement of the firewall apparatus, the second interface being connected to a wide area network and a process module for executing a communication process, via an interface identified in accordance with a network attribute and a type of a communication protocol of the client apparatus and based on the communication protocol, relative to the client apparatus.

15 Claims, 10 Drawing Sheets

U.S. PATENT DOCUMENTS

| | | | |
|---|---|---|---|
| 6,675,193 B1* | 1/2004 | Slavin et al. | 709/200 |
| 6,738,822 B2 | 5/2004 | Fukasawa et al. | |
| 7,031,904 B1* | 4/2006 | Wilson et al. | 709/230 |
| 7,107,609 B2* | 9/2006 | Cheng et al. | 726/3 |
| 7,185,361 B1* | 2/2007 | Ashoff et al. | 726/4 |
| 2001/0037461 A1* | 11/2001 | Conrath | 713/201 |
| 2002/0078198 A1* | 6/2002 | Buchbinder et al. | 709/224 |
| 2002/0087887 A1 | 7/2002 | Busam et al. | |
| 2002/0114322 A1* | 8/2002 | Xu et al. | 370/352 |
| 2002/0122416 A1 | 9/2002 | Xu et al. | |
| 2003/0033418 A1* | 2/2003 | Young et al. | 709/230 |
| 2004/0095937 A1 | 5/2004 | Piche et al. | |
| 2004/0114612 A1* | 6/2004 | Even et al. | 370/401 |
| 2004/0133631 A1* | 7/2004 | Hagen et al. | 709/203 |
| 2004/0158606 A1 | 8/2004 | Tsai | |
| 2004/0158644 A1* | 8/2004 | Albuquerque et al. | 709/238 |

OTHER PUBLICATIONS

Chao, H. et al. "Security-enhanced Packet Video with Dymanic Multicast Throughput Adjustment", 2001, John Wiley and Sons, Ltd. International Journal of Network Management. pp. 147-159.*

"Firewall Support", [online], by RealNetworks (registered trademark of RealNetworks, Inc, Internet URL: http://service.real.com/firewall/adminrs.html).

* cited by examiner

FIG. 3A

ADDRESS MANAGEMENT TABLE 141

| CLIENT NETWORK | PROTOCOL | PROCESSING UNIT | SETUP ADDRESS | REAL ADDRESS |
|---|---|---|---|---|
| NETWORK A | STREAM DATA DISTRIBUTION | STREAM DATA DISTRIBUTION | A.10 | A.10 |
| | BANDWIDTH MANAGEMENT | BANDWIDTH MANAGEMENT TRANSMISSION AND RECEPTION | | A.10 |
| INTERNET X | STREAM DATA DISTRIBUTION | STREAM DATA DISTRIBUTION | X.210 | C.10 |
| | BANDWIDTH MANAGEMENT | — | | — |

FIG. 3B

STREAM TRANSPORT MANAGEMENT TABLE 142

| CONTROL SESSION ID | STREAM TRANSPORT SESSION ID | STREAM DATA PROCESSING UNIT |
|---|---|---|
| 12345 | 1 | STREAM DATA DISTRIBUTION / BANDWIDTH MANAGEMENT |
| 12346 | 2 | TRANSMISSION RECEPTION |
| | | |

FIG. 4A

ROUTE SETTING INFORMATION OF FIREWALL

TRANSPORT INFORMATION

| TRANSPORT PACKET TYPE | PROCESS |
|---|---|
| CONNECTION TO TCP PORT 100<br>OTHERS | PASS<br>REJECT |

ROUTING INFORMATION

| DIRECTION | DESTINATION | PROCESS |
|---|---|---|
| OUT | NETWORK X | TRANSFER TO ROUTER |
| IN | NETWORK A | PASS |
| IN | OTHER NETWORKS | REJECT |

FIG. 4B

ROUTE SETTING INFORMATION OF ROUTER

ADDRESS TRANSLATION INFORMATION

| LOCAL IP ADDRESS | DIRECTION | GLOBAL IP ADDRESS |
|---|---|---|
| A. 10 | <-> | X. 110 |
| C. 10 | <-> | X. 210 |

ROUTING INFORMATION

| DIRECTION | DESTINATION | PROCESS |
|---|---|---|
| OUT | NETWORK X | TRANSMIT TO INTERNET X |
| IN | NETWORK A | TRANSFER TO FIREWALL |
| IN | OTHER NETWORKS | REJECT |

FIG. 9

| CLIENT NETWORK | PROTOCOL | PROCESSING UNIT | SETUP ADDRESS | REAL ADDRESS | SETUP PORT | REAL PORT |
|---|---|---|---|---|---|---|
| NETWORK A | STREAM DATA DISTRIBUTION | STREAM DATA DISTRIBUTION | A.20 | A.20 | REAL PORT | DYNAMIC |
| | BANDWIDTH MANAGEMENT | BANDWIDTH MANAGEMENT TRANSMISSION AND RECEPTION | | A.20 | REAL PORT | DYNAMIC |
| INTERNET X | STREAM DATA DISTRIBUTION | STREAM DATA DISTRIBUTION | X.210 | C.20 | REAL PORT | DYNAMIC |
| | BANDWIDTH MANAGEMENT | BANDWIDTH MANAGEMENT TRANSMISSION | | C.20 | TRANSMISSION UNIT REAL PORT | DYNAMIC RANGE a-b |
| | | BANDWIDTH MANAGEMENT RECEPTION | | A.20 | | STATIC 500 |

ROUTE SETTING INFORMATION OF FIREWALL

TRANSPORT INFORMATION

| TRANSPORT PACKET TYPE | PROCESS |
|---|---|
| CONNECTION TO TCP PORT 100 | PASS |
| IN PACKET TO UDP PORT 500 | PASS |
| OTHERS | REJECT |

FIG. 10B

ROUTE SETTING INFORMATION OF ROUTER

ADDRESS TRANSLATION INFORMATION

| LOCAL IP ADDRESS | DIRECTION | GLOBAL IP ADDRESS |
|---|---|---|
| A. 10 | <-> | X. 110 |
| C. 20 | -> | X. 210 |
| UDP A. 20 : 500 | <- | UDP X. 210 : a–b |

STREAM SERVER APPARATUS, PROGRAM, AND NAS DEVICE

BACKGROUND OF THE INVENTION

1. Field of the Invention

The present invention relates to a stream data distributing method and system, and more particularly to stream data distributing techniques capable of preventing illegal accesses to a stream data distributing server by a security mechanism such as a firewall.

2. Description of the Related Art

A stream data distributing system is generally constituted of a stream server and clients. The stream server has a storage for storing contents (e.g., image data and the like) and distributes stored contents. Each client transmits a stream data distribution request to the sever and reproduces the received stream data.

A firewall is software or hardware installed between the Internet and a network (LAN) used only in a private organization. The firewall prevents illegal accesses to LAN by monitoring network traffic at LAN and allowing only permitted packets to pass. The firewall permits only a packet whose protocol and destination port are allowed to be transmitted or received by using these protocol and port as permission keys. "Firewall Support", [online], by RealNetworks (registered trademark of RealNetworks, Inc, Internet URL: http://service.real.com/firewall/adminrs.html) proposes two stream data distributing methods in order to prevent illegal accesses to a stream server. One method distributes stream data by a UDP/IP transport protocol which allocates a dynamic port, and the other method distributes stream data by an HTTP protocol which allocates a static port.

When a stream server distributes stream data to a client in the same LAN as that of the stream server on the same side of a firewall, the stream server can distribute the stream data by the "UDP/IP protocol" using a "dynamic port" being designated by the client.

"Firewall Support" proposes the following two configurations in order to distribute stream data to a client on the Internet.

With one configuration, stream data is distributed by the "HTTP protocol" allocating the "static port". If stream data is to be distributed by the "UDP/IP protocol" allocating the "dynamic port", it is necessary to set the firewall in such a manner that all packets having ports settable by clients are permitted to be passed. However, this setting poses some security problem. In view of this, in order to distribute stream data to a client on the Internet by preventing illegal accesses to LAN, the stream data distributing method with the "HTTP protocol" allocating the "static port" has been proposed, with which method only particular destination ports can be set to the firewall.

With the other configuration, a stream server is installed also on the Internet outside the firewall. Since the stream server is installed outside the firewall, stream data can be distributed by the "UDP/IP protocol" allocating the "dynamic port" while illegal accesses to LAN are prevented.

SUMMARY OF THE INVENTION

Stream data distribution by the "HTTP protocol" such as a TCP/IP transport protocol has a larger protocol overhead than that of stream data distribution by the "UDP/IP protocol". Stream data distribution by the TCP/IP protocol is therefore associated with some problems such as a reduction in the number of clients capable of being broadcast and an arrival delay of a stream packet, resulting in a stream distribution performance degraded more than using the UDP/IP protocol.

If a stream server is installed outside the firewall as described above to perform stream data distribution by the UDP/IP protocol, at least two stream servers are required, one stream server distributing stream data to clients in LAN and the other stream server distributing stream data to clients on the Internet. Since the storage apparatuses for storing contents are necessary, the installation cost becomes expensive.

An object of the present invention is to prevent illegal accesses to a stream server and perform stream data distribution to clients both in LAN and on the Internet at the same stream data distribution performance without using an additional stream server.

According to one aspect of the present invention, a stream server apparatus is connected to client apparatuses and a firewall apparatus for inhibiting a packet from illegally intruding a particular network, and distributes stream data to the client apparatuses. The stream server apparatus has: a first interface for transmitting and receiving a packet to and from the client apparatus belonging to the particular network without involvement of the firewall apparatus and for transmitting and receiving a packet to and from the client apparatus belonging to a network different from the particular network via the firewall apparatus; a second interface for transmitting and receiving a packet to and from the client apparatus belonging to the network different from the particular network without involvement of the firewall apparatus, the second interface being connected to a second network; a stream transport management module for identifying the first interface or the second interface in accordance with a network attribute and a type of a communication protocol of the client apparatus; and a process module for executing a communication process based on the communication protocol relative to the client apparatus via the identified interface.

The process module of the stream server apparatus executes a stream data distribution process based on a same communication protocol for both the client apparatus belonging to the particular network and the client apparatus belonging to the network different from the particular network. It is preferable that the communication protocol uses a UDP/IP protocol.

The stream transport management module of the stream server apparatus identifies the first interface, if the client apparatus belongs to the network different from the particular network for which the firewall apparatus inhibits illegal accesses and if the communication protocol includes a reception process of a packet on a side of the stream server apparatus. The stream transport management module identifies the second interface, if the client apparatus belongs to the network different from the particular network for which the firewall apparatus inhibits illegal accesses and if the communication protocol does not include a reception process of a packet on a side of the stream server apparatus. In this case, the stream transport management module identifies the second interface, if the client apparatus belongs to the network different from the particular network for which the firewall apparatus inhibits illegal accesses and if the communication protocol is a stream data distributing protocol. The stream transport management module of the stream server apparatus identifies the first interface, if the client apparatus belongs to a same network as a network to which the stream server apparatus belongs.

The process module of the stream server apparatus has a stream transport processing unit for executing stream data distribution to the client apparatus based upon one stream data distribution protocol, and a bandwidth management processing unit for executing bandwidth control communication based on a control program for controlling a bandwidth of the stream data distribution.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are diagrams showing examples of an address management table and a stream transport management table.

FIGS. 4A and 4B are diagrams showing examples of route setting information.

FIG. 9 is a diagram showing an example of the structure of an address management table.

FIGS. 10A and 10B are diagrams showing examples of the structures of address management tables.

DESCRIPTION OF THE EMBODIMENTS

First, the first embodiment will be described (from FIG. 1 to FIG. 6).

Figure 1:
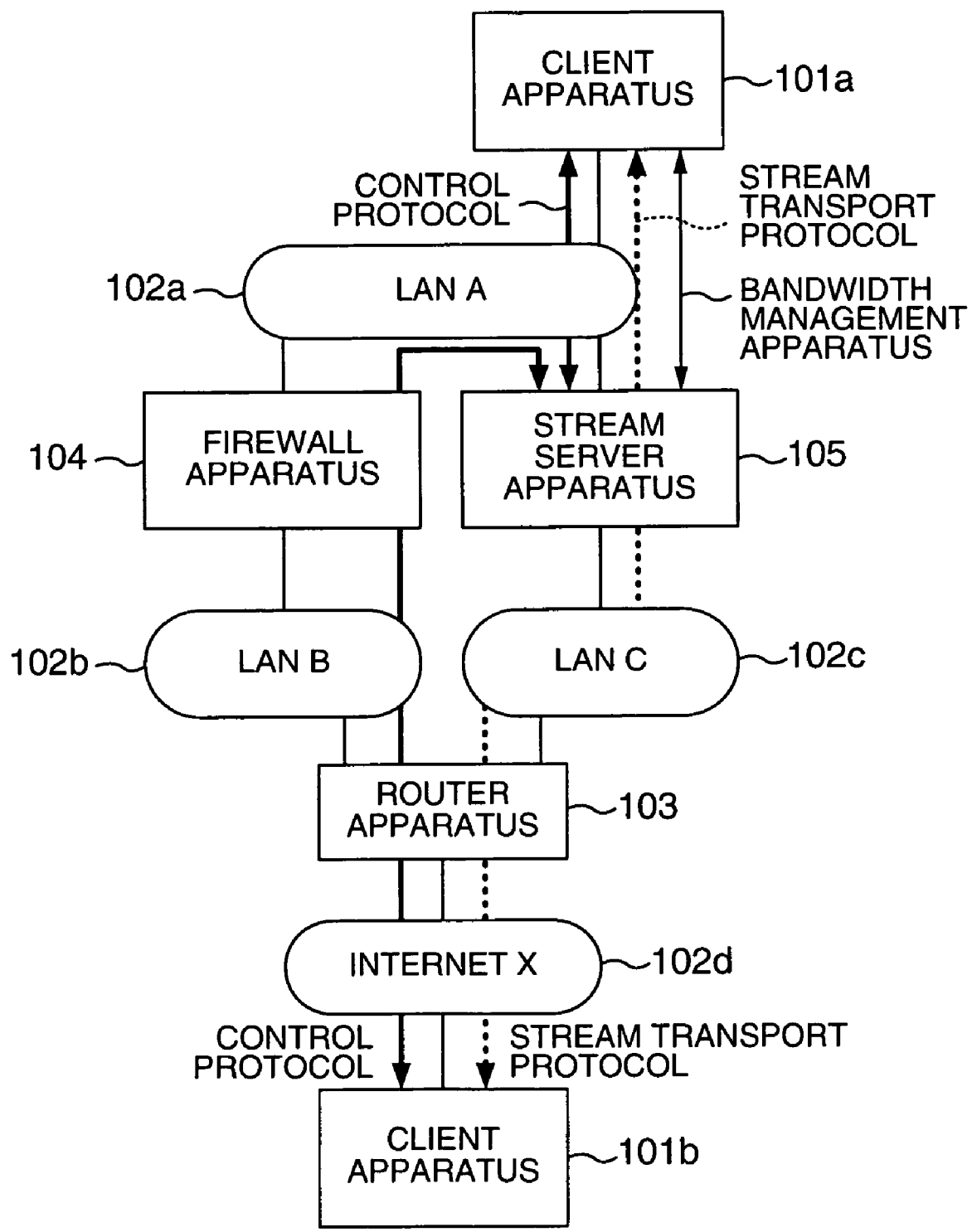
FIG. 1 is a diagram showing an example of a stream data distributing system according to a first embodiment of the invention.

FIG. 1 shows an example of the structure of a stream data distributing system according to the first embodiment of the invention.

The stream data distributing system includes: client apparatuses 101 (101a, 101b) for requesting stream data distribution; a stream server apparatus 105 for stream data distribution of stored contents; a firewall apparatus 104 for preventing illegal accesses to a LAN 102a; a router apparatus 103 as a network relay apparatus for network interconnections by executing a routing process; and networks 102 (102a to 102d) as communication paths for interconnections of these apparatuses.

The network 102a is a communication line (in this embodiment, a LAN line) for interconnections among a network interface unit 113 of the client apparatus 101a, a network interface unit 113a of the stream server apparatus 105 and a network interface unit 113 of the firewall apparatus 104. The network 102b is a communication line (in this embodiment, a LAN line) for interconnections between a network interface unit of the firewall apparatus 104 and a network interface unit 113 of the router apparatus 103. The network 102c is a communication line (in this embodiment, a LAN line) for interconnections between a network interface unit 113b of the stream serve apparatus 105 and a network interface unit 113 of the router apparatus 103. The network 102d is a communication line (in this embodiment, a LAN line) for interconnections between a network interface unit 113 of the router apparatus 103 and a network interface unit 113 of the client apparatus 101b.

The stream server apparatus 105 has at least one or more network interface units 113a connected to LAN 102a and at least one or more network interface units 113b connected to the Internet 102d (via LAN 102c and router apparatus 103).

The stream server apparatus 105 performs communications (based on a control protocol, a stream transport protocol and a bandwidth management protocol) with the client apparatus 101a connected via LAN 102a, without involvement of the firewall apparatus 104.

For communications with the client apparatus 101b connected via the Internet 102d, the stream server apparatus 105 uses the network interface unit 113a for communications based upon the control protocol via the firewall apparatus 104, and uses the network interface unit 113b for stream data distribution based upon the stream transport protocol without involvement of the firewall apparatus 104.

The stream transport protocol can therefore use a transport layer protocol of the no-connection type (hereinafter assumed to be UDP/IP) for both the client apparatus 101a on LAN 102a and the client apparatus 101b on the Internet 102d. In this embodiment, the control protocol uses a transport layer protocol of a connection type (hereinafter assumed to be TCP/IP). The bandwidth management protocol uses the same transport layer protocol as that used by the stream transport protocol. The control protocol and bandwidth management protocol perform two-way communications, whereas the stream transport protocol performs one-way communications from the stream server apparatus 105 to client 101 for packet transmission.

The control protocol has a procedure for initial settings of stream data distribution (hereinafter called SETUP), a procedure for instruction of stream data distribution start (hereinafter called PLAY) and a procedure for instruction of stream data distribution end (hereinafter called TEARDOWN).

The client apparatus 101 requests stream data distribution by notifying the stream server apparatus 105 of the following information (SETUP). The information includes: an ID of contents to be requested; an Internet protocol address (hereinafter abbreviated into an IP address) at which a stream transport packet and a bandwidth management packet are received; a port number of the transport layer protocol (UDP/IP) which is used for receiving a stream transport packet; a port number which is used for transmission/reception of the bandwidth management packet.

In response to this SETUP, the stream server apparatus 105 notifies the client apparatus 101 of the following information. The information includes: an IP address from which a stream transport packet and a bandwidth management packet are transmitted; a port number of the transport protocol (UDP/IP) which is used when transmitting a stream transport packet; and a port number which is used for transmission/reception of a bandwidth management packet. A pair of ports of the client apparatus 101 and stream server apparatus 105 is therefore identified and each of a stream transport communication path and a bandwidth management communication path can be established.

The client apparatus 101 performs a stream protocol packet reception process by using the stream transport communication path established by SETUP upon issuance of the stream data distribution start instruction to the stream server apparatus 105, and also performs a bandwidth management protocol packet transmission/reception process by using the bandwidth management communication path established by SETUP (PLAY).

In response to PLAY, the stream server apparatus 105 transmits a stream protocol packet via the stream protocol communication path and transmits/receives a bandwidth management protocol packet via the bandwidth management communication path, to thereby start stream data distribution.

The stream data distribution process according to the embodiment of the invention will be described in detail. In this embodiment, although the bandwidth management protocol is not used relative to the client apparatus 101b on the Internet 102d, it may be used as in the case of the second embodiment.

Figure 2A:
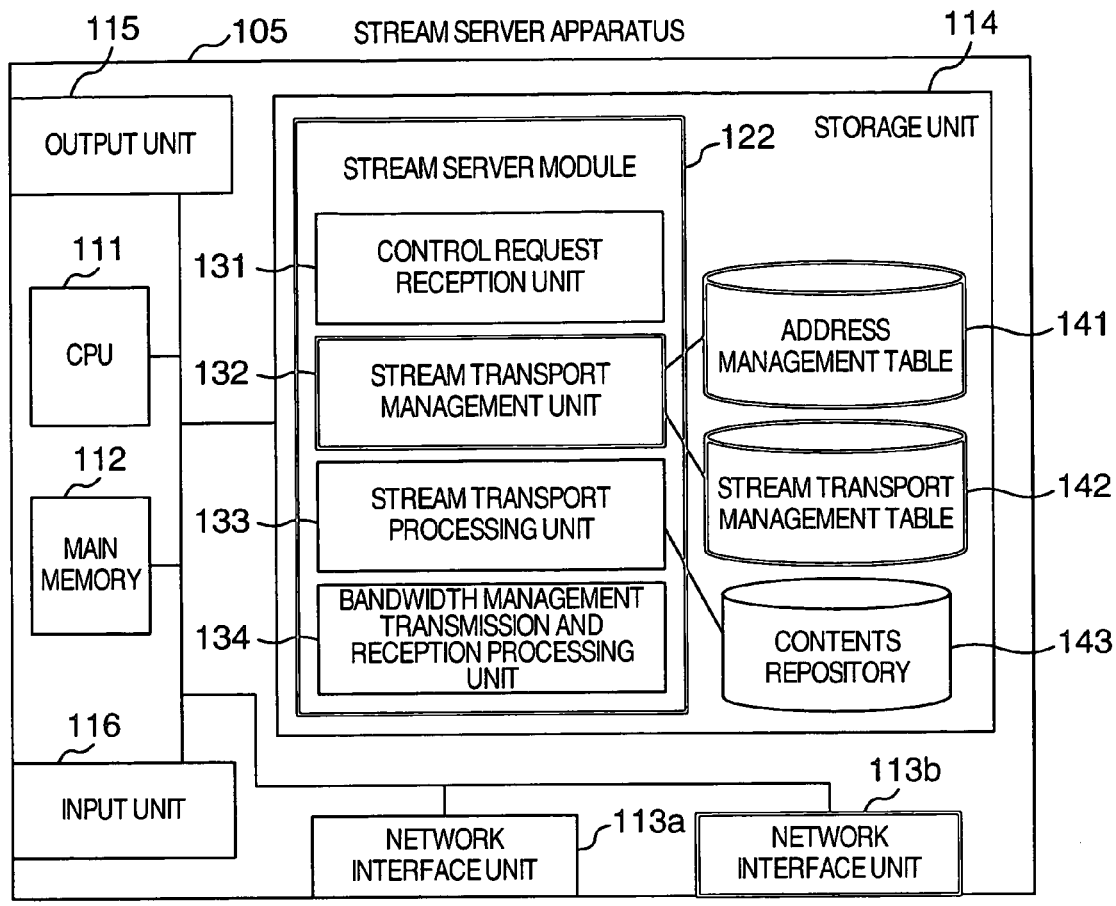
FIGS. 2A and 2B are diagrams showing examples of module structures of the system of the first embodiment.
Figure 2B:
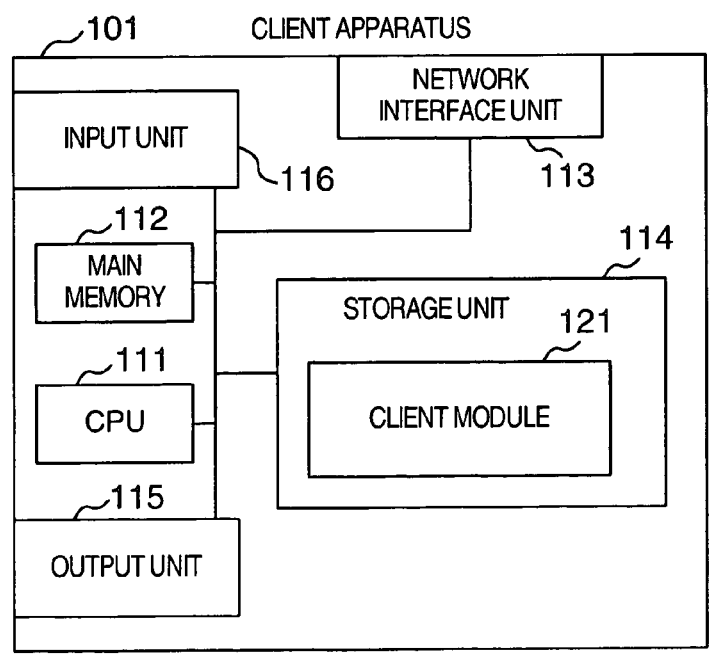

FIG. 2A is a diagram showing the structure of the stream server apparatus 105 and its module structure, and FIG. 2B is a diagram showing the structure of the client apparatus 101 and its module structure.

The stream server apparatus 105, client apparatus 101, router apparatus 103 and firewall apparatus 104 are each a computer constituted of a CPU 111, a main memory 112, a network interface unit 113, a storage unit 114, an output unit 115, an input unit 116 and the like. The number of each constituent element is not limited only to that shown in FIGS. 2A and 2B, but there may be a plurality of same constituent elements. The storage unit 114 may be a so-called RAID apparatus. Each apparatus may be provided with CPU 111 or a controller in the storage unit 114 which performs a file system process of controlling the conversion between an input/output access via the network interface unit 113 in the unit of file and an input/output access to/from the storage unit 114 in the unit of block (Network Attached Storage). The stream server apparatus 105 has at least two network interface units 113 which are connected to LAN 102a and LAN 102c, respectively. The firewall apparatus 104 has at least two network interface units 113 which are connected to LAN 102a and LAN 102b, respectively. The router apparatus 103 has at least three network interface units 113 which are connected to LAN 102b, LAN 102c and the Internet 102d, respectively.

Description will be first made on the address management table 141 and stream transport management table 142 of the stream server apparatus 105 and the route setting information to be set to the firewall apparatus 104 and router apparatus 103.

FIGS. 3A shows an example of the structure of the address management table 141, and FIG. 3B shows an example of the structure of the stream transport management table 142. In the following description, an IP address allowed to be used on the Internet is called a "global IP address", and an IP address allowed to be used on the network other than the Internet is called a "local IP address". A protocol packet transmission source IP address notified by the stream server apparatus 105 in the SETUP procedure of the control protocol is called a "SETUP address", and an IP address used when the stream server apparatus 105 actually transmits a protocol packet is called a "real address". In this embodiment, a local IP address of "A. 10" is assigned to the network interface unit 113a to be connected to LAN 102a, whereas a local IP address of "C. 10" is assigned to the network interface unit 113b to be connected to the Internet 102d (via LAN 102c). The local IP addresses of "A. 10" and "C. 10" are in correspondence with global addresses of "X. 110" and "X. 210", respectively.

The address management table 141 stores therein the information on: a network address field of the IP address assigned to the network interface unit 113 of the client apparatus 101; a protocol executable by each client apparatus 101; a processing unit for performing the protocol; a SETUP address; and a real address. For the client apparatus 101a in LAN 102a, a network administrator sets, as the real address and SETUP address in the address management table 141, the local IP address of "A. 10" of the network interface unit 113a of the stream server apparatus 105 connected to LAN 102a. For the client apparatus 101b on the Internet 102d, the network administrator sets, as the real IP address, the local IP address of "C. 10" of the network interface unit 113b of the stream server apparatus 105 connected to LAN 102c, and as the SETUP address, the global IP address of "X. 210".

The stream server apparatus 105 transmits a stream data distribution packet to the client apparatus 101b on the Internet 102d by using the real address of "C. 10". In accordance with address translation information, the router apparatus 103 translates the local IP address of "C. 10" in the IP packet into the global IP address of "X. 210" to perform a routing process. In this manner, the packet arrives at the client apparatus 101b from the global IP address of "X. 210" notified as the SETUP address. The local IP address can therefore be kept in secret from the client apparatus 101b.

The stream transport management table 142 stores therein the information on: a control session ID; a stream transport session ID assigned for identifying a stream data distribution communication path constituted of a port of the client apparatus 101 and a port of the stream server apparatus 105, the IDs being issued from the client apparatus 101 and assigned for identifying a series of stream data distribution procedures based upon the control protocol; and the stream transport processing unit 133 or bandwidth management transmission and reception processing unit 134 to be used with each stream transport session ID.

In accordance with the information on the relation between the global IP address and local IP address to be used by the stream server apparatus 105 and the information on the SETUP address in the address management table 141, the network administrator creates the route setting information to be set to the firewall apparatus 104 and the route setting information to be set to the router apparatus 103.

FIG. 4A shows the route setting information for the firewall apparatus 104. The route setting information includes transport information and routing information. In this embodiment, a static port 100 of the TCP/IP protocol is used for the control protocol, and a dynamic port of the UDP/IP protocol is used for the stream data distribution protocol and bandwidth management protocol.

The transport information includes the information indicating that a packet should be allowed to pass the port 100 of the TCP protocol and rejected to pass other ports, in order to pass only the control protocol packet.

The routing information includes the information indicating that an IP packet having the Internet 102d as its destination should be transferred to the router apparatus 103, the IP packet having LAN 102a as its destination should be passed, and the IP packet having a different destination should be rejected.

FIG. 4B shows the route setting information for the router apparatus 103. This route setting information includes address translation information and routing information.

The address translation information includes the information on a local IP address, a corresponding global IP address and a translation direction of the addresses. The network administrator registers the global IP address to be used by the stream server apparatus 105 and the corresponding local IP address, as the address translation information of the router apparatus 103.

In order not to allow a packet from the Internet 102*d* to enter LAN 102*c*, the routing information is set in such a manner that the IP packet having as its destination the Internet 102*d* should be transferred to the Internet 102*d*, the IP packet having LAN 102*a* as its destination should be transferred to the firewall apparatus 104, and the IP packet having a different destination should be rejected.

In this manner, all packets sent from the Internet 102*d* to the stream server apparatus 105 are input to the firewall apparatus 104 so that illegal packets are prevented from entering LAN 102*a* (and hence the client apparatus 101*a* and stream server apparatus 105).

Detailed description will be made on the function of each structure of the apparatus shown in FIGS. 2A and 2B.

The stream server apparatus 105 and client apparatus 101 each store the number of the usable port (socket) in the storage unit 114.

The client apparatus 101 has a client module 121 and issues a communication request by designating its own IP address, an IP address of the network interface unit 113 of the stream server apparatus 105 to which the communication request is to be issued, a usable port number and a standby port number of the stream server apparatus 105.

The stream server apparatus 105 has a stream server module 122 which is constituted of a control request reception unit 131, a stream transport management unit 132, a stream transport processing unit 133 and a bandwidth management transmission and reception processing unit 134.

In response to the request from the client apparatus 101, the control request reception unit 131 executes a control protocol process to be later detailed.

The stream transport management unit 132 determines: a control session ID; and a stream transport session ID for identifying a stream data distribution communication path to be established based upon a port of the client apparatus 101 and a port of the stream server apparatus 105, the IDs being assigned for identifying a series of stream data distribution procedures. The stream transport management unit 132 registers the determined IDs in the stream transport management table 142.

In accordance with the information received from the client apparatus 101 and the contents of the address management table 141 and stream transport management table 142, the stream transport management unit 132 instructs the stream transport processing unit 133 or bandwidth management transmission and reception processing unit 134 to execute the communication process based upon the requested protocol via the network interface unit 113 assigned the IP address set to the address management table 141. The stream transport management unit 132 registers the information representative of the stream transport processing unit 133 or bandwidth management transmission and reception processing unit 134 instructed in the stream transport management table 142 for each stream transport session ID.

More specifically, upon reception of a packet designating LAN 102*a* as the network address of the transmission source client apparatus 101 and in accordance with the contents of the address management table 141, the stream transport management unit 132 instructs the stream transport processing unit 133 or bandwidth management transmission and reception processing unit 134 to execute the stream transport protocol process or bandwidth management protocol process via the network interface unit 113*a* indicated by the address "A. 10". In this case, the control request reception unit 131 notifies the client apparatus 101*a* of the address "A. 10" during the procedure SETUP.

Upon reception of a packet designating the Internet 102*d* as the network address of the transmission source client apparatus 101 and in accordance with the contents of the address management table 141, the stream transport management unit 132 instructs the stream transport processing unit 133 to execute the stream transport protocol process via the network interface unit 113*b* indicated by the address "C. 10". In this case, the control request reception unit 131 notifies the client apparatus 101*b* of the address "X. 210" during the procedure SETUP.

In accordance with the stream transport protocol, the stream transport processing unit 133 reads the stream data contents from a contents repository 143 of the storage unit 114 and distributes them via the network interface unit 113 designated by the stream transport management unit 132.

In accordance with the bandwidth management protocol, the bandwidth management transmission and reception processing unit 134 transmits and receives packets via the network interface unit 113 designated by the stream transport management unit 132.

Namely, for the client apparatus 101*a* on LAN 102*a*, the stream transport processing unit 133 or bandwidth management transmission and reception processing unit 134 transmits and receives the stream data distribution protocol packet or bandwidth management protocol packet via the network interface unit 113*a* at the IP address "A. 10". For the client apparatus 101*b* on the Internet 102*d*, the stream transport processing unit 133 distributes the stream data distribution protocol packet via the network interface unit 113*b* at the IP address "C. 10". In this embodiment, as described earlier, the bandwidth management process is not set to the client apparatus 101*b* on the Internet 102*d*.

The client module 121 is a program stored in the storage unit 114 of the client apparatus 101, read in the main memory 112 and executed by CPU 111. The stream server module 122 is a program stored in the storage unit 114 of the stream server apparatus 105, read in the main memory 112 and executed by CPU 111. Communications between the client module 121 and stream server module 122 are performed by using the network interface units 113, transport interfaces (such as socket interface) provided by an operating system of an open system, and transport communications (such as TCP/UDP/IP).

Figure 5:
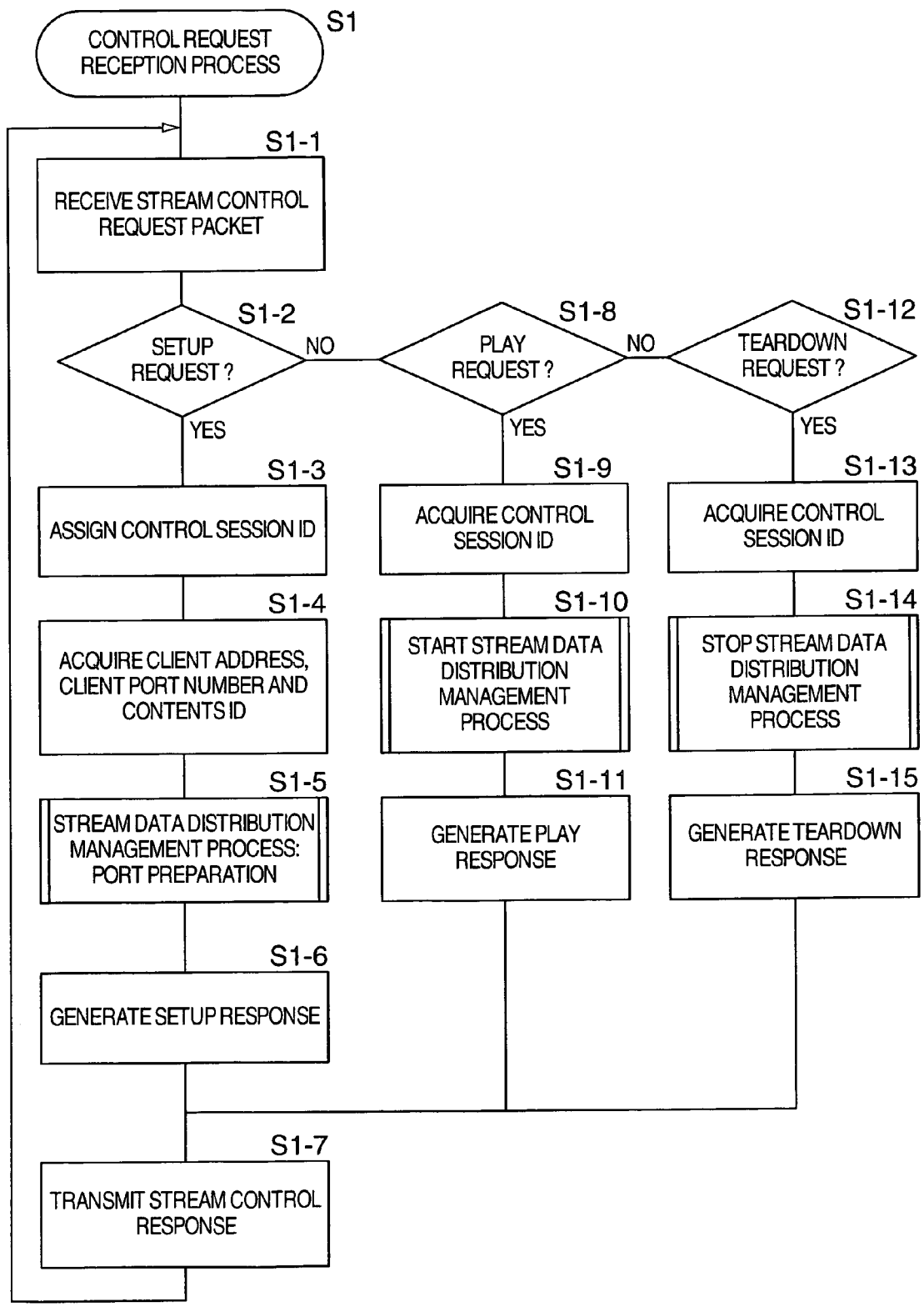
FIG. 5 is a flow chart illustrating an example of a control request reception process.
Figure 6:
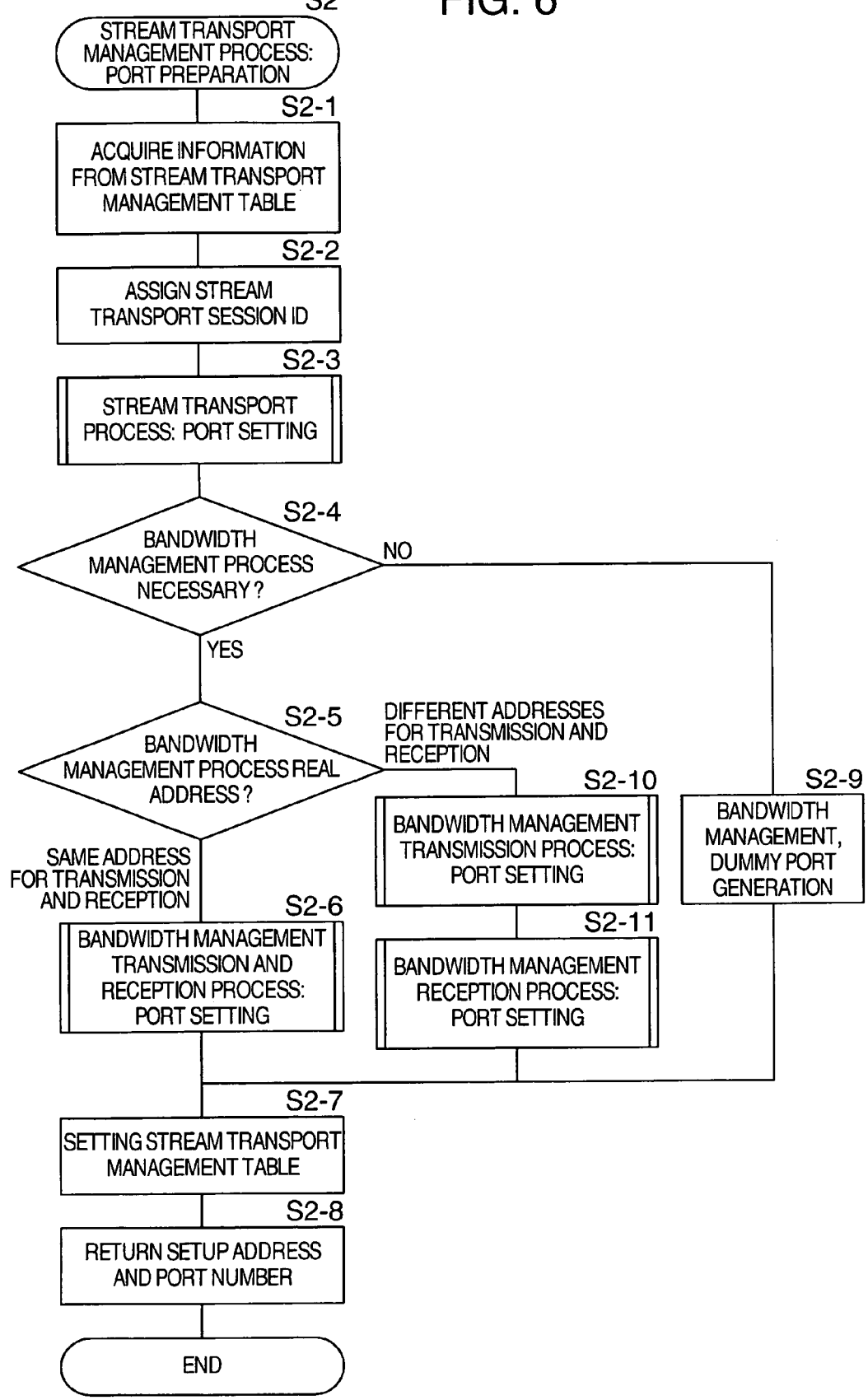
FIG. 6 is a flow chart illustrating an example of a stream transport management process.

Next, the process to be executed by the stream server module 122 will be described (FIGS. 5 and 6).

FIG. 5 is a flow chart illustrating a process to be executed by the control request reception unit 131.

In a control request reception process (S1), the control request reception unit 131 receives a control protocol packet via the network interface unit 113*a* at the IP address "A. 10" by using the port 100 of the TCP/IP protocol (S1-1).

The control request reception unit 131 judges whether the received packet is a SETUP request (S1-2).

If the received packet is the SETUP request, the control request reception unit 131 assigns a control session ID (S1-3).

The control request reception unit 131 acquires the IP address of the transmission source client apparatus 101, the port number of the client apparatus 101 and the contents ID, respectively contained in the SETUP request packet (S1-4).

Next, in accordance with the port number of the client apparatus 11 and the contents ID, the control request reception unit 131 instructs the stream transport management unit 132 to prepare for a port (S1-5). In this case, the stream transport management unit 132 notifies the control request unit 131 of the SETUP address and the port numbers for the stream transport protocol and bandwidth management protocol.

In accordance with the control session ID and the SETUP address and port numbers notified from the stream transport management unit 132, the control request reception unit 131 generates a SETUP response (S1-6) and transmits a control protocol packet to the client apparatus 101 (S1-7).

If it is judged at S1-2 that the received packet is not the SETUP packet, the control request reception unit 131 judges whether the received packet is a PLAY request (S1-8).

If the received packet is the PLAY request, the control request reception unit 131 acquires a control session ID from the PLAY request packet (S1-9). The control request reception unit 131 identifies a series of stream data distribution procedures from the control session ID.

The control request reception unit 131 instructs the stream transport management unit 132 to start a process (S1-10).

In accordance with the control session ID, the control request reception unit 131 generates a PLAY response (S1-11) and transmits a control protocol packet to the client apparatus 101 (S1-7).

If it is judged at S1-8 that the received packet is not the PLAY request, the control request reception unit 131 judges whether the received packet is a TEARDOWN request (S1-12).

If the received packet is the TEARDOWN request, the control request reception unit 131 acquires a control session ID from the TEARDOWN request packet (S1-13). The control request reception unit 131 identifies a series of stream data distribution procedures from the control session ID.

The control request reception unit 131 instructs the stream transport management unit 132 to terminate the process (S1-14).

In accordance with the control session ID, the control request reception unit 131 generates a TEARDOWN response (S1-15) and transmits a control protocol packet to the client apparatus 101 (S1-7).

FIG. 6 is a flow chart illustrating a process to be executed by the stream transport management unit 132, stream transport processing unit 133 and bandwidth management transmission and reception processing unit 134.

Upon reception of an instruction to prepare for a port from the control request reception unit 131 at S1-5, the stream transport management unit 132 starts a port preparation process (S2). The stream transport management unit 132 receives the control session ID and the IP address and port number of the client apparatus 101 from the control request reception unit 131.

In accordance with the received IP address of the client apparatus 101 and the contents of the address management table 141, the stream transport management unit 132 acquires the information on the protocol, the processing unit for executing the protocol, the SETUP address and the real address (S2-1).

The stream transport management unit 132 assigns a stream transport session ID to the received control session ID (S2-2).

Upon this instruction, the stream transport processing unit 133 receives from the stream transport management unit 132 the stream transport session ID, the real address, the IP address and port number of the client apparatus 101 and the contents ID.

The stream transport processing unit 133 prepares for stream data distribution by dynamically assigning the port (port number) for the stream transport protocol, and notifies the stream transport management unit 132 of the assigned transmission port number (S2-3).

In accordance with the contents of the address management table 141, the stream transport management unit 132 judges whether the bandwidth management process is to be executed (S2-4). More specifically, in this embodiment, if the IP address of the transmission source client apparatus 101 belongs to the Internet 102$d$, the stream transport management unit 132 judges that the bandwidth management protocol should not be executed, whereas if the IP address of the transmission source client apparatus 101 belongs to LAN 102$a$, the stream transport management unit 132 judges that the bandwidth management protocol should be executed.

If the stream transport management unit 132 judges at S2-4 that the bandwidth management protocol should be executed, the stream transport management unit 132 further judges from the contents of the address management table 141 whether the process based upon the bandwidth management protocol uses different real addresses or the same real address for transmission and reception, and instructs the bandwidth management transmission unit 135 or bandwidth management transmission and reception processing unit 134 to perform a bandwidth management process (S2-5). S2-10 and S2-11 will be described in the second embodiment.

The bandwidth management transmission and reception processing unit 134 receives from the stream transport management unit 132 the stream transport session ID and real address, the IP address and port number of the client apparatus 101 and the contents ID.

The bandwidth management transmission and reception processing unit 134 prepares for a bandwidth management process by dynamically assigning the port (port number) for the bandwidth management process, and notifies the stream transport management unit 132 of the assigned port number (S2-6).

If it is judged from the contents of the address management table 141 that the bandwidth management protocol is not executed, the stream transport management unit 132 generates a dummy transmission and reception port number for the bandwidth management protocol (S2-9).

The stream transport management unit 132 registers in respective items of the stream transport management table 142 the acquired control session ID, the acquired stream transport session ID, and the protocol processing unit for executing a process based on the protocol (IDs of the steam transport processing unit 133 and bandwidth management transmission and reception processing unit 134 for the client apparatus 101$a$, an ID of the stream transport processing unit 133 for the client apparatus 101$b$) (S2-7).

The stream transport management unit 132 transmits to the client apparatus 101$b$ the SETUP address derived from the address management table 141, the port number obtained from the stream transport processing unit 133, and the port number obtained from the bandwidth management transmission and reception processing unit 134 or the dummy transmission and reception port number for the bandwidth management protocol (different port numbers if the stream data distribution and bandwidth management processes are to be executed) (S2-8).

If the stream transport management unit 132 is instructed at S1-10 by the control request reception unit 131 to start the stream transport management process, the stream transport management unit 132 receives the control session ID from the control request reception unit 131.

In accordance with the control session ID and the contents of the stream transport management table 142, the stream transport management unit 132 acquires the stream transport session ID and the information on the processing unit for executing the process based on the protocol, and passes the stream transport session ID to the corresponding protocol processing unit 133 or 134 and instructs the protocol processing unit to start the process based on the corresponding protocol.

Each protocol processing unit 133 or 134 reads the contents corresponding to the stream transport session ID, and executes a communication process based on the designated protocol relative to the port of the network interface unit 113 of the client apparatus 101 via the network interface unit 113 at the real address corresponding to the stream transport session ID.

If the stream transport management unit 132 is instructed at S1-14 by the control request reception unit 131 to terminate the stream transport management process, the stream transport management unit 132 receives the control session ID from the control request reception unit 131.

In accordance with the control session ID and the contents of the stream transport management table, the stream transport management unit 132 acquires the stream transport session ID and the information on the processing unit for executing a process based on the protocol, and passes the stream transport session ID to the corresponding processing unit to instruct the processing unit to terminate the process based on the corresponding protocol. In this manner, each protocol processing unit terminates the protocol process corresponding to the stream transport session ID.

As described above, when stream data is distributed to the client apparatus 101b on the Internet 102d, the stream server module 122 distributes the stream data to the client module 121 on the Internet 102d via the dynamical transmission port at the IP address of "C. 10".

The router apparatus 103 translates the IP address of "C. 10" contained in the stream packet distributed from the stream server module 122 into the address of "X. 210" and transmits it to the client module 121 on the Internet 102d.

The client module 121 on the Internet 102d receives the stream packet at the dynamic transmission port at the IP address of "X. 210".

Even if the client module 121 transmits a bandwidth management protocol packet to the transmission and reception dummy port at the IP address of "X. 210", this packet is rejected by the router apparatus 103 and does not reach the stream server apparatus 105.

According to this embodiment, based upon the stream transport protocol having a high stream transport performance, a single stream server apparatus 105 can distribute stream data to both the client apparatuses 101b and 101b on the Internet 102d and on LAN 102a.

A packet is passed to the network 102a containing the stream server apparatus 105 always via the firewall server 104. It is therefore possible to prevent an illegal packet from entering the network 102a.

Next, the second embodiment will be described (FIGS. 5 to 10B).

In the first embodiment, a stream data distribution process is executed by the stream server apparatus 105. A main different point in the second embodiment is that this process is executed by a NAS device 106. Another different point is that the client apparatus 101b on the Internet 102d can use the bandwidth management protocol.

Figure 7:
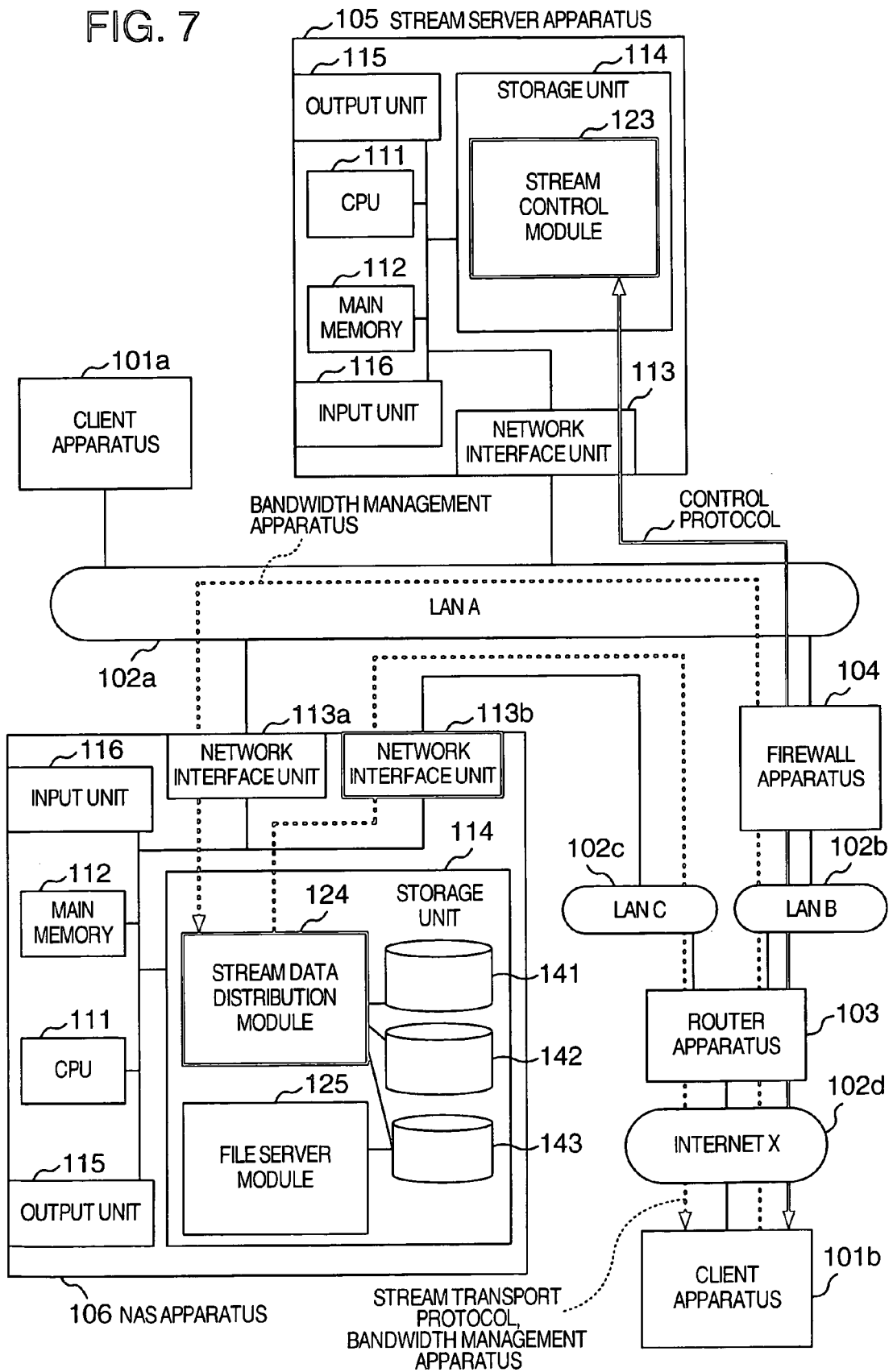
FIG. 7 is a diagram showing an example of a stream data distributing system according to a second embodiment of the invention.

FIG. 7 is a diagram showing the configuration of a stream data distributing system of the second embodiment.

A storage device directly connected to a network, a so-called file server apparatus (Network Attached Storage device: NAS device) 106, is added to the stream data distributing system shown in FIG. 1. The number of each constituent element is not limited only to that shown in FIG. 7. The stream server apparatus 105 performs stream control based on the control protocol.

The NAS device 106 has a stream data distribution module 124 for executing stream data distribution and a file server module 125 to be used for sharing files of contents.

The file server module 125 registers the requested contents in the volume 143 by converting an access request from the client apparatus 101 in the unit of file into an access request in the unit of data block.

The stream server apparatus 105 and NAS device 106 are disposed in the network (LAN A) whose security is kept by the firewall apparatus 104.

Figure 8A:
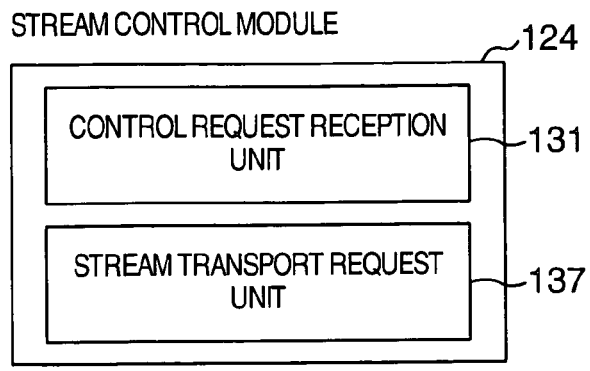
FIGS. 8A and 8B are diagrams showing examples of module structures of the system of the second embodiment.
Figure 8B:
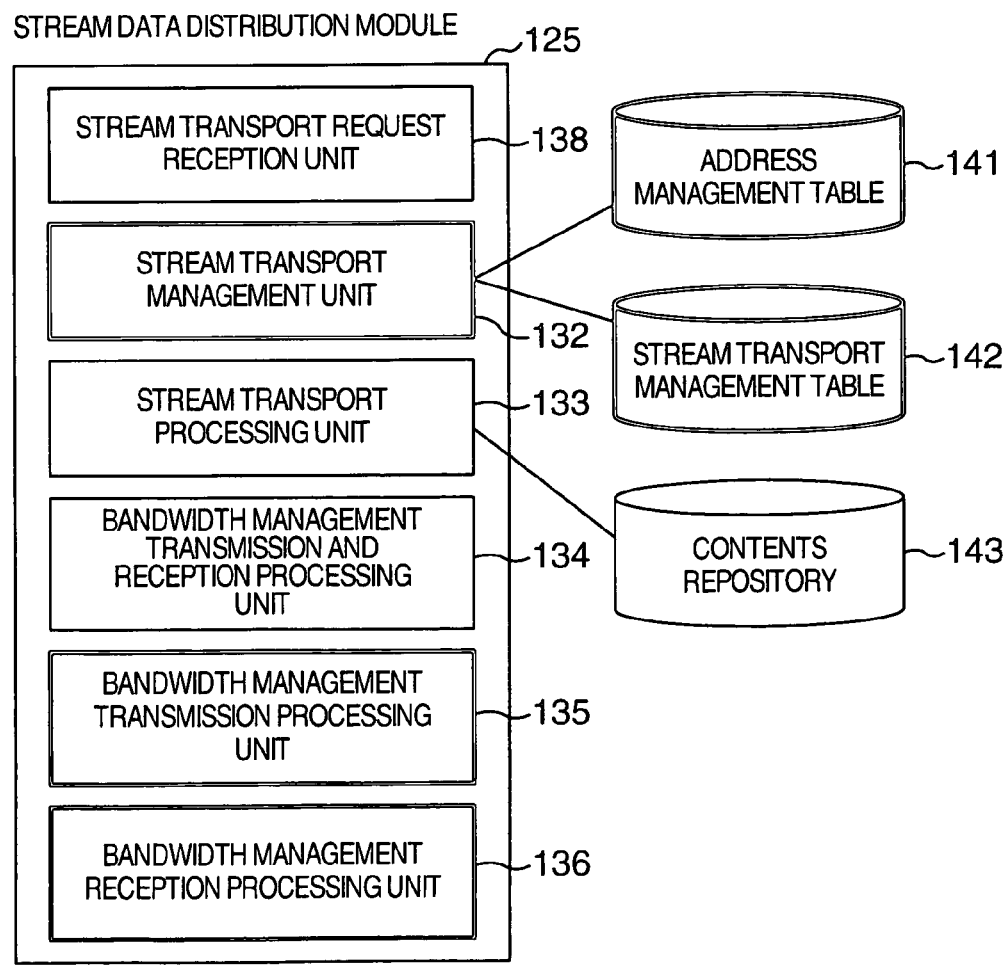

FIG. 8A shows an example of the structure of the stream control module of the stream server apparatus 105, and FIG. 8B shows an example of the structure of the stream data distribution module of the NAS device 106. The stream control module 123 is a program stored in the storage unit 114 of the stream server apparatus 105 and is realized by writing the program into the main memory 112 and executing it by CPU 111. The stream data distribution module 124 and file server module 125 are programs stored in the storage unit 114 of the NAS device 106 and are realized by reading them into the main memory 112 and executing them by CPU 111. A portion or the whole of the processes executed by CPU 111 in the NAS device may be executed by a CPU in the storage unit.

The stream control module 123 is constituted of a control request reception unit 131 and a stream transport request unit 137.

The stream data distribution module 124 is constituted of a stream transport request reception unit 138, a stream transport management unit 132, a stream transport processing unit 133, a bandwidth management transmission and reception processing unit 134, a bandwidth management transmission processing unit 135 and a bandwidth management reception processing unit 136 respectively for performing a bandwidth protocol process for the client apparatus 101b on the Internet 102d.

The stream transport request unit 137 and a stream transport request reception unit 138 transfer a stream transport request from the control request unit 131 of the stream server apparatus 105 to the stream transport management unit 132 of the NAS device 106.

The file server module 125 stores contents in the contents repository 143 of the storage unit 114.

The stream server apparatus 105 has a network interface unit 113 connected to at least one LAN 102a. This network interface unit is assigned a local IP address of "A. 10".

The NAS device 106 has at least two network interfaces units, a network interface unit 113a connected to a LAN 102a and a network interface unit 113b connected to the Internet 102d (via LAN 102c). In this embodiment, a local IP address of "A. 20" is assigned to the network interface unit 113a, and a local IP address of "C. 10" is assigned to the network interface unit 113b.

In this embodiment, for the client apparatus 101a on LAN 102a, a control protocol process is executed by the stream control module 123 at the local IP address "A. 10", and a stream transport protocol process and a bandwidth management protocol process are executed by the stream data distribution module 124 at the local IP address of "A. 10". For the client apparatus 101b on the Internet 102d, a control protocol process is executed by the stream control module 123 at the local IP address of "A. 10", a stream transport protocol process and a bandwidth management protocol transmission process are executed by the stream data distribution module 124 at the local IP address of "C. 20" and a bandwidth management protocol reception process is executed by the stream data distribution module 124 at the local IP address of "A. 20".

The local IP address of "A. 10" is assigned a global IP address of "X. 110", and the local IP addresses of "A. 20" and "C. 20" are assigned a global IP address of "X. 210". Translation between a local IP address and a global IP address is performed by the router apparatus 103. The router apparatus 103 also performs port number translation in accordance with address translation information.

It is assumed that the stream control module 123 uses a static port 100 of the TCP/IP protocol for a process based on a control protocol. It is also assumed that the stream data distribution module 124 uses a dynamic port of the UDP/IP protocol for a transmission and reception process based on the stream transport protocol and bandwidth management protocol, relative to the client apparatus 101a on LAN 102a. It is also assumed that for the client apparatus 101b on the Internet 102d, a dynamic port (range of "a to b") is used for a transmission process based on the stream transport protocol and bandwidth management protocol, and a static port 500 is used for a reception process based on the bandwidth management protocol.

FIG. 9 is an address management table 141 of this embodiment. As different from the first embodiment, the address management table 141 newly uses real port information and SETUP port information. The "real port" information is the information on a port prepared by the NAS device 106 for protocol packet transmission and reception, and indicates a discrimination between a static port and a dynamic port, a usable port number and the like. The "SETUP port" information is the information on a port notified by the NAS device 106 in the control protocol SETUP procedure.

The contents set in the address management table shown in FIG. 9 will be described in detail.

If the network address of the client apparatus 101 belongs to LAN 102a, the stream transport protocol process and bandwidth management protocol process are executed by using the same real address of "A. 20" as the SETUP address. A port to be used as a real port is dynamically acquired and the acquired real port is used as the SETUP port.

If the network address of the client apparatus 101 belongs to the Internet 102d, the stream transport protocol process is executed by using the real address of "C. 20". For the bandwidth management protocol process, a transmission process is executed by using the real address of "C. 20" and a reception process is executed by using the real address of "A. 20". The address of "X. 210" is used as the SETUP address. A dynamically acquired port is used as the real port for a stream transport protocol process, and the acquired real port is used as the SETUP port. A dynamic port in the range from "a to b" is used as the real port for a bandwidth management protocol transmission process, and the static port 500 is used as the real port for a reception process. A real port acquired by a bandwidth protocol transmission process is used as the SETUP port for a bandwidth management protocol transmission process.

FIG. 10A shows route setting information for the firewall apparatus 104 and FIG. 10B shows route setting information for the router apparatus 103. Route setting is performed in accordance with the information on a relation between a global IP address and a local IP address to be used by the stream server apparatus 105 and NAS device 106, the SETUP address information in the address management table 141 and the SETUP port information.

The transport information for the firewall apparatus 104 is different from that of the first embodiment.

The transport information is set in the following manner in order to pass only a control protocol packet and a bandwidth management protocol packet destined to the IP address of "A. 20". Only a packet to be connected to the port 100 of the TCP protocol and a reception packet at a port 500 of the UDP protocol are allowed to pass, and other packets are rejected.

The address translation information for the router apparatus 103 is also different from that of the first embodiment.

In order to allow the Internet 102d to use the stream control module 123, the address translation information includes a translation table storing the local IP address of "A. 10" of the stream server apparatus 105 and the corresponding global IP address of "X. 110".

In order to allow the stream data distribution module 124 to transmit a stream transport packet to the Internet 102d, the address translation information includes a translation table storing the local address of "C. 20" and the corresponding global IP address of "X. 210".

In order to allow to receive a bandwidth management protocol packet, the address translation information includes a table for converting a UDP packet having a port number in the range of "a to b" and destined to the global IP address of "X. 210" into a UDP packet having the port number 500 and destined to the local IP address of "A. 20".

FIG. 5 is the flow chart illustrating the process to be executed by the stream control module 123.

The stream control module 123 performs a control request reception process (S1).

In this embodiment, a process is transferred via LAN 102 A between the control request reception unit 131 and stream transport management unit 132 by using the stream transport request unit 137 and stream transport request reception unit 138 as interfaces.

FIG. 6 is the flow chart illustrating the process to be executed by the stream data distribution module 124.

The stream data distribution module 124 performs three stream transport management processes including a port preparation process, a start process and an end process.

In this embodiment, the stream transport processing unit acquires at S2-1 the protocol for processing. If the network address of the client apparatus belongs to the Internet 102d, the bandwidth management transmission processing unit 135 and bandwidth management reception processing unit 136 execute a bandwidth management protocol process.

At S2-5, if the stream transport management unit judges from the contents of the address management table 141 that a bandwidth management process is to be performed, the stream transport management unit 132 activates the bandwidth management transmission processing unit 135 (S2-10) and bandwidth management reception processing unit 136 (S2-11).

The bandwidth management transmission processing unit 135 receives the stream transport session ID, real address, real port information, client IP address, client port number and contents ID.

The bandwidth management transmission processing unit 135 dynamically acquires a transmission port in the range from "a to b" by using the received real address to prepare for transmission, and notifies the port number to the stream transport management unit 132.

The bandwidth management reception processing unit 136 receives the stream transport session ID, real address, real port information, client IP address, client port number and contents ID.

The bandwidth management reception processing unit 136 prepares for reception by using the received real address and a static port.

The stream transport management unit 132 registers in the stream transport management table 142 the control session ID, stream transport session ID and the information on the protocol processing units (stream transport processing unit, bandwidth management transmission processing unit and bandwidth management reception processing unit) (S2-7).

In accordance with the contents of the address management table 141, the stream transport management unit 132 returns the SETUP address and SETUP port (real port acquired by the bandwidth management transmission processing unit 135) to the client apparatus 101 (S2-8).

With the above-described processes, the client module 121 of the client apparatus 101b on the Internet 102d receives the stream transport protocol packet by using the dynamic transmission port at the IP address of "X. 210".

The client module 121 of the client apparatus 101b receives the bandwidth management protocol packet by using the dynamic transmission and reception port.

The stream data distribution module 124 distributes the stream transport protocol packet and bandwidth management protocol packet by using the dynamic transmission port at the IP address of "C. 20".

In this case, the router apparatus 103 translates the local IP address of "C. 20" in the IP packet into the global IP address of "X. 210".

The client module 121 of the client apparatus 101b transmits the bandwidth management protocol packet to the dynamic transmission and reception port at the IP address of "X. 210".

In this case, the router apparatus 103 translates the global address of "X. 210" into the reception port 500 at the local IP address of "A. 20" to direct the packet thereto.

The firewall apparatus 104 transfers the packet destined to the reception port 500 at the IP address of "A. 20" to the stream data distribution module 124 of the NAS device 106.

According to the invention, stream data can be distributed to both the client on LAN and the client on the Internet at similar stream transport performance, while an illegal access to the stream server apparatus is prevented and a server facility is not additionally used.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A stream server apparatus connected to a first network and a second network, said stream server apparatus comprising:

wherein said first network connects said stream server apparatus and a first client apparatus and a firewall apparatus;

wherein said second network connects said stream server apparatus and a second client apparatus and said firewall apparatus, wherein said stream server apparatus communicates via a first path that includes said first network and said first client apparatus, via a second path that includes said first network and said firewall apparatus and said second client apparatus, and via a third path that includes said second network and said second client apparatus; a first interface which transmits and receives control request packets and data packets to and from said first client apparatus via the first path and being capable of transmitting and receiving control request packets to and from said second client apparatus via said second path;

a second interface which transmits and receives data packets to and from the second client apparatus via the third path;

a stream transport management module which specifies said first interface or said second interface in accordance with a network attribute of the first client apparatus and the second client apparatus, and specifies distribution protocol for each client apparatus based on a network to which said client apparatus is connected, wherein, if the destination of transmission is said first client apparatus which is connected to said first network, then bandwidth control is executed and said first client apparatus is notified of a port number identifying a port through which communications are to be conducted, wherein if the destination of transmission is said second client apparatus which is connected to said second network, then bandwidth control is not executed by said stream server apparatus and said second client apparatus is notified of a dummy port number identifying a dummy port through which communications are not conducted;

a bandwidth management processing module which dynamically assigns a port and identifies the port by a port number and executes the bandwidth control based on a bandwidth control protocol for controlling a bandwidth of the stream data distribution; and a process module which executes a communication process based on communication protocols related to said first and second client apparatuses via said first interface or the second interface.

2. The stream server apparatus according to claim 1, wherein said process module executes a stream data distribution process based on a same protocol for both said first client apparatus and said second client apparatus.

3. The stream server apparatus according to claim 2, wherein said communication protocol uses a user datagram protocol.

4. The stream server apparatus according to claim 1, further comprising:

a control request reception module which notifies an ID of the interlace specified by said stream transport management module to the client apparatuses.

5. The stream server apparatus according to claim 4, wherein said control request reception module notifies said second client apparatus of the ID of the specified interface, said ID being not a local ID distinguishable by said first network but a global ID capable of being translated into the local ID by a network relay apparatus en route to said second client apparatus via said second path and said third path.

6. The stream server apparatus according to claim 1, wherein said stream transport management module specifies said first interface, if the communication protocol includes a reception process of a packet for said stream server apparatus from said second client apparatus via said second path.

7. The stream server apparatus according to claim 1, wherein said stream transport management module specifies said second interface, if the communication protocol does not include a reception process of a packet for said stream server apparatus from said second client apparatus via said second path.

8. The stream server apparatus according to claim 1, wherein said stream transport management module specifies said second interface, if the communication protocol is said stream data distributing protocol from said stream server apparatus for said second client apparatus via said third path.

9. The stream server apparatus according to claim 1, wherein said stream transport management module specifies said first interface, if the client apparatus belongs to the same network as said first network to which said stream server apparatus belongs.

10. The stream server apparatus according to claim 1, wherein said stream transport management module specifies the first or second interface in accordance with a network address of the first or second network received from the first or second client apparatus via the first or the second path.

11. A network attached storage system for managing a file system and distributing stream data stored in a storage unit to client apparatuses via networks, said network attached storage system, being connected to a first network and a second network, comprising:
   a stream server apparatus for distributing the stream data, wherein said first network connects said stream server apparatus and a first client apparatus and a firewall apparatus;
   wherein said second network connects said stream server apparatus and a second client apparatus and said firewall apparatus,
   wherein said stream server apparatus communicates via a first path that includes said first network and said first client apparatus, via a second path that includes said first network and said firewall apparatus and said second client apparatus, and via a third path that includes said second network and said second client apparatus;
   a first interface, coupled to said stream server apparatus, for transmitting and receiving control request packets and data packets to and from said first client apparatus via the first path and being capable of transmitting and receiving control request packets to and from said second client apparatus via said second path; and
   a second interface, coupled to said stream server apparatus, for transmitting and receiving data packets to and from the second client apparatus via the third path,
   wherein said stream server apparatus comprises:
   a stream transport management module which specifies said first interface or said second interface in accordance with a network attribute of the first client apparatus and the second client apparatus, specifies distribution protocol for each client apparatus based on a network to which said client apparatus is connected,
   wherein, if the destination of transmission is said first client apparatus which is connected to said first network, then bandwidth control is executed and said first client apparatus is notified of a port number identifying a port through which communications are to be conducted,
   wherein if the destination of transmission is said second client apparatus which is connected to said second network, then bandwidth control is not executed by said stream server apparatus and said second client apparatus is notified of a dummy port number identifying a dummy port through which communications are not conducted,
   a bandwidth management processing module which dynamically assigns a port and identifies the port by a port number and executes the bandwidth control based on a bandwidth control protocol for controlling a bandwidth of the stream data distribution, and
   a process module which executes a communication process based on communication protocols related to said first and second client apparatuses via said first interface or said second interface.

12. An apparatus including a storage medium with a program contained therein, the program executable by a stream server apparatus connected to a first network and a second network, wherein said first network connects said stream server apparatus and a first client apparatus and a firewall apparatus, wherein said second network connects said stream server apparatus and a second client apparatus and said firewall apparatus, wherein said stream server apparatus communicates via a first path that includes said first network and said first client apparatus, via a second path that includes said first network and said firewall apparatus and said second client apparatus, and via a third path that includes said second network and said second client apparatus, wherein said stream server apparatus comprises a first interface which transmits and receives receiving control request packets and data packets to and from said first client apparatus via the first path and being capable of transmitting and receiving control request packets to and from said second client apparatus via said second path, and a second interface which transmits and receives data packets to and from the second client apparatus via the third path, said second interface being connected to a wide area network, said program, when executed, causing the stream server apparatus to perform;
   a stream transport management step of identifying said first interface or said second interface in accordance with a network attribute of the first client apparatus and the second client apparatus and specifying a distribution protocol for each client apparatus based on a network to which said client apparatus is connected,
   wherein, if the destination of transmission is said first client apparatus which is connected to said first network, then bandwidth control is executed and said first client apparatus is notified of a port number identifying a port through which communications are to be conducted,
   wherein if the destination of transmission is said second client apparatus which is connected to said second network, then bandwidth control is not executed by said stream server apparatus and said second client apparatus is notified of a dummy port number identifying a dummy port through which communications are not conducted,
   a bandwidth management processing step of dynamically assigning a port and identifying the port by a port number, and executing the bandwidth control based on a bandwidth control protocol for controlling a bandwidth of the stream data distribution; and
   a step of executing a communication process based on the communication protocols related to said first and second client apparatuses via said first interface or said second interface.

13. The apparatus according to claim 12, wherein said stream transport management step comprises:
   a step of specifying the first or second interface in accordance with a network address of the first or second network received from the first or second client apparatus via the first or second path.

14. A stream server apparatus connected to a first network and a second network, said stream server apparatus comprising:
   wherein said first network connects said stream server apparatus and a first client apparatus and a firewall apparatus;
   wherein said second network connects said stream server apparatus and a second client apparatus and said firewall apparatus,
   wherein said stream server apparatus communicates via a first path that includes said first network and said first client apparatus, via a second path that includes said first network and said firewall apparatus and said second client apparatus, and via a third path that includes said second network and said second client apparatus;
   a first interface which transmits and receives control request packets and data packets to and from said first client apparatus via the first path and being capable of transmitting and receiving control request packets to and from said second client apparatus via said second path;
   a second interface which transmits and receives data packets to and from the second client apparatus via the third path;
   a stream transport management module which specifies said first interface or said second interface in accordance with a network attribute of the first client apparatus and the second client apparatus, and specifies distribution protocol for each client apparatus based on a network to which said client apparatus is connected,
   wherein, if the destination of transmission is said first client apparatus which is connected to said first network, then bandwidth control is executed by said stream server apparatus and said first client apparatus is notified of a port number identifying a port through which communications are to be conducted,
   wherein if the destination of transmission is said second client apparatus which is connected to said second network, then bandwidth control is not executed and said second client apparatus is notified of a dummy port number identifying a dummy port through which communications are not conducted;
   a bandwidth management processing module which dynamically assigns a port and identifies the port by a port number and executes the bandwidth control based on a bandwidth control protocol for controlling a bandwidth of the stream data distribution: and
   a process module which executes a communication process based on communication protocols related to said first and second client apparatuses via said first interface or said second interface,
   wherein said process module executes a stream data distribution process based on a user datagram protocol (UDP) as the same communication protocol both for the first and second client apparatuses.

15. The stream server apparatus according to claim 14, wherein said stream transport management module specifies the first or second interface in accordance with a network address of the first or second network received from the first or second client apparatus via the first or second path.

* * * * *